United States Patent

Ainsley et al.

[11] Patent Number: 5,908,521
[45] Date of Patent: *Jun. 1, 1999

[54] METHOD OF MANUFACTURING MULTILAYER PLASTERBOARD

[75] Inventors: John Ainsley, Cotgrave; John James Bradshaw, Borrowash; Arthur George Terry Ward, Wollaton, all of United Kingdom

[73] Assignee: BPB Industries Public Limited Company, Slough, United Kingdom

[*] Notice: This patent is subject to a terminal disclaimer.

[21] Appl. No.: 08/958,373

[22] Filed: Oct. 27, 1997

Related U.S. Application Data

[62] Division of application No. 08/273,858, Jul. 12, 1994, Pat. No. 5,714,032.

[30] Foreign Application Priority Data

Jul. 12, 1993 [GB] United Kingdom .................... 9314399

[51] Int. Cl.⁶ ............................... B28B 5/02; B28B 19/00; B32B 31/06; B32B 31/08
[52] U.S. Cl. ................................. 156/43; 156/78
[58] Field of Search .............................. 156/39, 43, 346, 156/78; 366/14, 15; 106/680, 772, 783

[56] References Cited

U.S. PATENT DOCUMENTS

| | | | |
|---|---|---|---|
| 1,953,589 | 4/1934 | Camp | 156/346 |
| 2,940,505 | 6/1960 | Brothers. | |
| 2,985,219 | 5/1961 | Summerfield. | |
| 4,176,972 | 12/1979 | Stiling. | |
| 4,279,673 | 7/1981 | White et al.. | |
| 4,354,885 | 10/1982 | White | 156/39 |
| 4,942,003 | 7/1990 | Bold. | |
| 5,246,287 | 9/1993 | Isherwood et al. | 366/15 |
| 5,484,200 | 1/1996 | Bradshaw | 366/15 |
| 5,575,844 | 11/1996 | Bradshaw | 106/680 |

FOREIGN PATENT DOCUMENTS

| | | |
|---|---|---|
| 0153588 | 9/1985 | European Pat. Off.. |
| 2011198 | 2/1970 | France. |
| 1261435 | 2/1968 | Germany. |
| 1278917 | 9/1968 | Germany. |
| 2833427 | 2/1980 | Germany. |
| 1705094 | 1/1992 | U.S.S.R.. |
| 9303899 | 3/1993 | WIPO. |

OTHER PUBLICATIONS

Translation of German Patent No. 1 278 917, published Sep. 26, 1968.

*Primary Examiner*—Steven D. Maki
*Attorney, Agent, or Firm*—Birch, Stewart, Kolash & Birch, LLP

[57] ABSTRACT

The apparatus includes a two-stage mixer formed within a single housing and including a first high shear mixer and a second low shear mixer. Plaster slurry is formed in the first mixer. A partition is laid on a first fixing sheet, a portion laid on a second fixing sheet, and the remainder discharged to the second mixer. In the second mixer, foam is added and the formed slurry is laid on the unformed slurry on the first fixing sheet. The unformed slurry in the second fixing sheet is brought to the formed slurry to join the product.

22 Claims, 2 Drawing Sheets

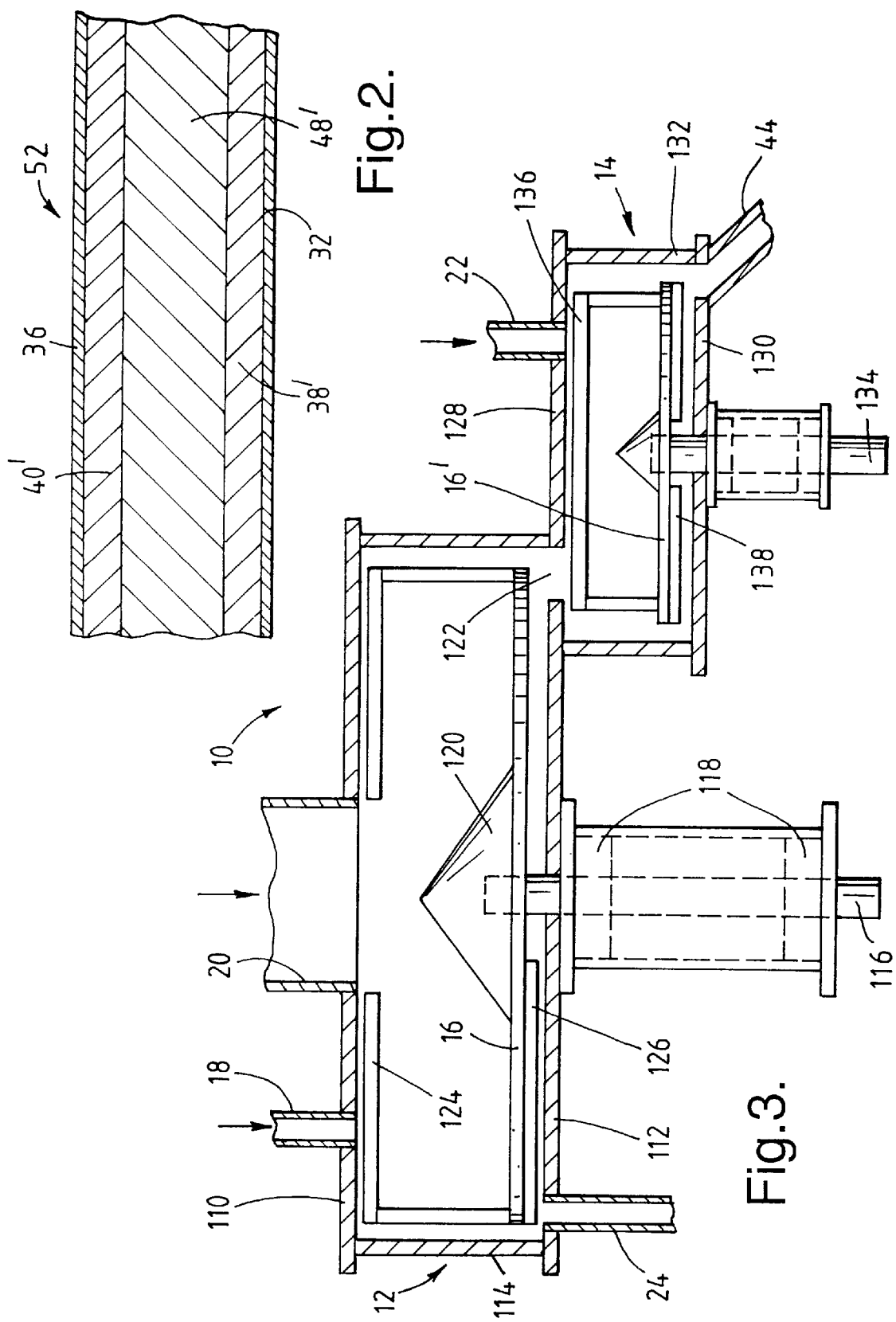

METHOD OF MANUFACTURING MULTILAYER PLASTERBOARD

This application is a divisional of application Ser. No. 08/273,858, filed on Jul. 12, 1994, now U.S. Pat. No. 5,714,032.

BACKGROUND OF THE INVENTION

1. Field of the Invention

The invention relates to a method of manufacturing a multilayer plasterboard in which a core layer of the board has a different density from the outer layers, and to an apparatus therefor.

2. Description of Related Art

The manufacture of a multilayer gypsum plasterboard is disclosed in U.S. Pat. No. 2,940,505. This document discloses the application of thin layers of gypsum plaster slurry to two paper liners. A core layer of gypsum plaster slurry is applied to the first slurry coated liner, and the second slurry coated liner is brought onto the exposed surface of the core. A very satisfactory bond between the liners and the plaster is said to result, even without the use of starch or other adhesive. The apparatus disclosed in U.S. Pat. No. 2,940,505 includes three slurry mixers, supplying gypsum slurry to the two paper liners and the core respectively. In practice, this necessitates complex control systems to ensure synchronicity between the mixes and to ensure that each mixer supplies slurry at the correct rate. The capital and running costs of such an arrangement are high compared to a conventional plasterboard manufacturing line with only one mixer.

SUMMARY OF THE INVENTION

According to the present invention there is provided a method for making a multilayer set cementitious product comprising: the steps of (a) dispersing particulate cementitious material in a liquid medium under conditions of relatively high shear to form a first slurry;

(b) blending a first portion of the first slurry with foam under conditions of relatively low shear to form a second, foamed, slurry;

(c) depositing a first layer of one of a second portion of the first slurry and the second slurry on a support; and (d) depositing a second layer of the other of the second portion of the first slurry and the second slurry on the surface of the first layer.

In preferred embodiments, the first layer is of the first slurry.

Preferably, a third layer of the same slurry as the first layer is deposited on the second layer. Also preferably, the first and third layers are deposited on facing sheets.

Preferably, the foam is formed prior to blending with the initial dispersion. Preferred foams are formed by incorporating air into a liquid medium.

Additives or other ingredients of the second slurry may be added at any stage, but preferably in step (b), in which the foam is mixed with the first slurry of the particulate material.

The invention also provides an apparatus for making a multilayer set cementitious product which comprises: at least one rotary mixer element operative in a first mixing zone and adapted to develop relatively high shear to produce a first slurry of the particulate material, the first zone having inlets for the particulate material and a liquid medium; and at least one rotary mixer element operative in a second mixing zone of relatively low shear in direct communication with the first mixing zone, the second mixing zone being provided with an inlet for a foam component and an outlet for the second, foamed, slurry of particulate material, and the first zone having a second outlet for the first slurry.

If a preformed foam is employed, the inlet to the second zone is an inlet for the preformed foam. Inlets may additionally be provided for additives or other ingredients, usually solid, of the slurries.

A preferred embodiment of this invention comprises: a first mixing chamber containing a first mixing rotor adapted to be driven at a relatively high speed and having inlets for the particulate material and for a liquid (such as water) and first and second outlets for the resulting first slurry; a second mixing chamber containing a second mixing rotor adapted to be driven at a lower speed than the first mixing rotor and having inlets for the first slurry of the particulate material and for a foam component and an outlet for the second, foamed, slurry, the first outlet of the first mixing chamber being disposed to deliver the first slurry directly into the corresponding inlet of the second mixing chamber.

The relatively high shear in the first mixing zone or chamber is preferably developed by rotating the mixing rotor in the first mixing zone at a peripheral speed of 10–50 m/s. Where the second mixing rotor is provided in the second mixing zone it is preferably rotated at a peripheral speed in the range of 0.1 to 10 m/s. Preferably the shear rate in the first zone is at least 5 times as great as in the second zone and may be 30 times more. It is preferred that the inlets for the particulate material and the liquid in the first mixing zone should be at smaller radial distances from the rotational axis of the mixing rotor than the outlet for the first slurry. Similarly it is preferred that the inlets for the first slurry and the foam in the second mixing zone should be radially less distant from the axis of rotation of the mixing rotor than the outlet for the aerated slurry. In both cases, this means that the input is in a relatively low energy region of the mixer and the output from a relatively high energy region.

The preferred apparatus according to the invention further comprises: a support for slurry; a first slurry application station adjacent the support and in communication with one of the first outlets from the first zone or chamber and the outlet from the second zone or chamber, the first station comprising a slurry outlet and a spreader for spreading slurry on the support; and a second station adjacent the support and in communication with the other of the outlets, the second station comprising a slurry outlet and a spreader for spreading slurry on the support. Preferably, a third station is in communication with the same zone or chamber as the first station. In a preferred embodiment, the first and third stations are in communication with the first outlet from the first zone or chamber, so that the outer layers of the finished plasterboard are unfoamed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be further described, by way of example, with reference to the accompanying drawings, in which:

FIG. 2 shows a section through a board made by the invention; and

FIG. 3 shows a section through a preferred mixer according to the invention.

DETAILED DESCRIPTION OF PREFERRED EMBODIMENTS

Figure 1:
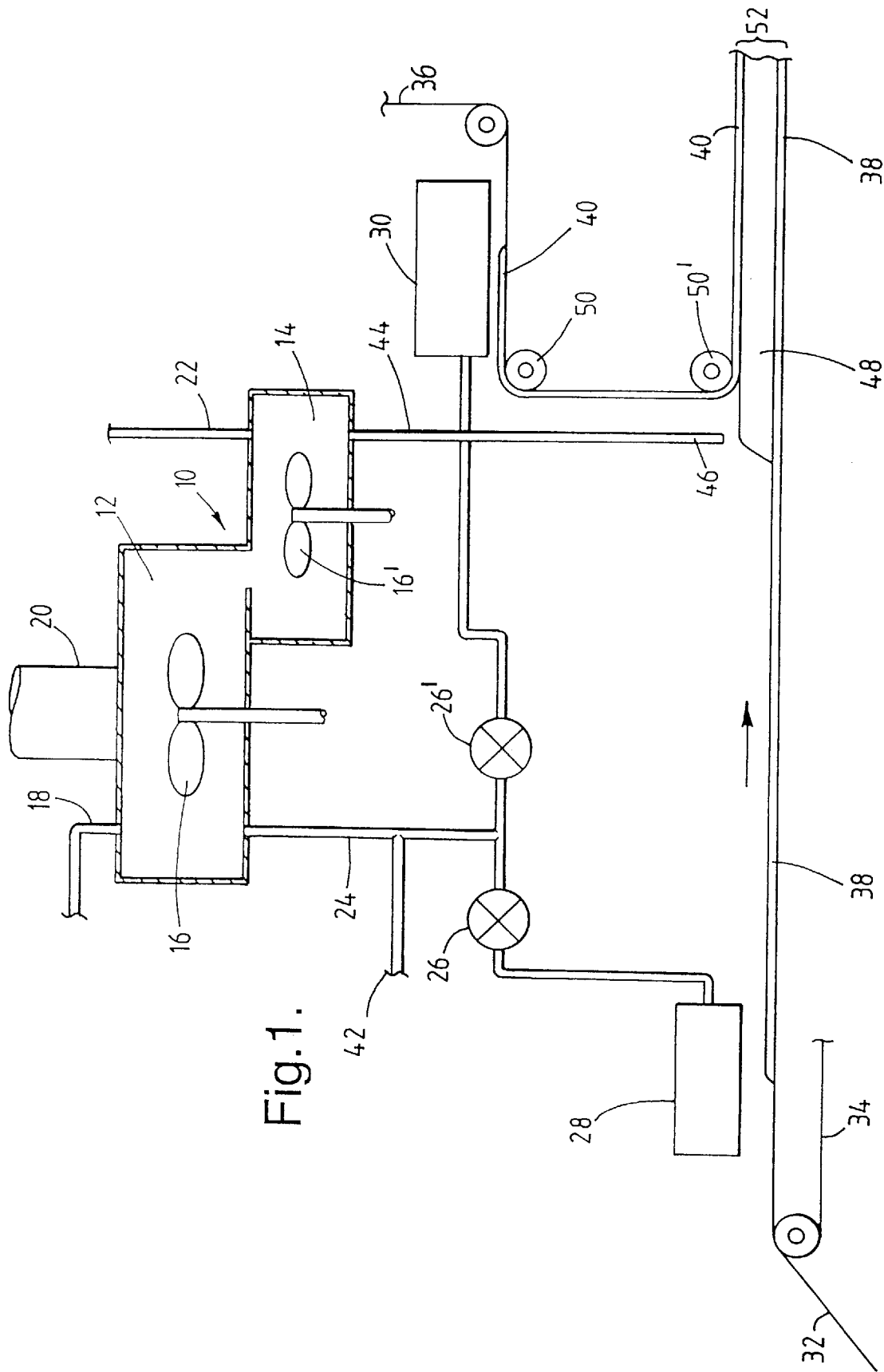
FIG. 1 shows diagrammatically a preferred apparatus according to the invention.

The apparatus shown diagrammatically in FIG. 1 comprises a two-stage mixer 10, including a first, high shear, mixing chamber 12 and a second, low, shear, mixing chamber 14, each having a rotor 16, 16', respectively for mixing the contents. Water and stucco are supplied continuously to the first chamber 12 through inlets 18, 20. The water and stucco are subjected to high shear mixing conditions by rotor 16. Some of the resulting slurry passes directly from the first chamber 12 to the second, low shear, chamber 14. A preformed foam is also supplied to the second chamber through an inlet 22. The foam is blended with the slurry under conditions of low shear to produce a foamed slurry.

The slurry from the first chamber 12 which does not pass directly into the second chamber leaves the first chamber through outlet 24, and is pumped by pumps 26, 26' to first 28 and third 30 slurry deposition stations. At the first station, the slurry is deposited and spread by air knives on a liner paper 32 carried on a continuous belt 34, the return run of which is shown in FIG. 1. In an alternative embodiment, spreading is achieved with rollers, rather than air knives. The upper run of the belt 34 travels in the direction shown by the arrow in FIG. 1. Similarly, at the third station 30, the slurry is deposited and spread on a second liner paper 36. Thus, layers 38, 40 of the unfoamed slurry on liner paper are formed. In order to assist adhesion of the slurry to the liner papers, starch may be added to the slurry through an inlet 42 immediately upstream of the pumps 26, 26'.

The foamed slurry formed in the second chamber 14 leaves the second chamber through an outlet 44 which leads the foamed slurry to a second slurry deposition station 46, which is a conventional slurry outlet.

The continuous belt 34 carries the first liner paper 32 with the first layer 38 of slurry thereon from the first station 28 to the second station 46. At the second station, foamed slurry is deposited and spread on the layer 38 of unfoamed slurry to form a foamed slurry layer 48. The second liner paper 36 carrying the layer 40 of unfoamed slurry is passed over two rollers 50, 50' each of which turns the paper through 90° to reverse the liner paper so that the unfoamed slurry layer 40 is below the liner paper rather than above it, as it was formed. As the liner paper 36 passes around the second roller 50', the slurry layer 40 comes into contact with the foamed slurry layer 48 on the belt 34. In an alternative embodiment, the unfoamed slurry is deposited on the vertical run of the second liner paper 36 between the two rollers 50,50'.

The plaster is then set and dried in a conventional manner, to provide a gypsum board 52 as shown in FIG. 2 having a lightweight foamed core 48' between more dense unfoamed layers 38', 40', faced on both sides with liner paper 32, 36. By using the method and apparatus of the invention, the outer layers 38', 40', may be as much as 50% or more dense than a conventional plasterboard. These layers are typically at least 0.5 mm in thickness and are preferably 1 mm thick and the foamed core is typically 10 mm thick.

FIG. 3 shows a preferred mixer 10. As shown, it comprises a first mixing chamber 12 formed from a top wall plate 110, a bottom wall plate 112 and a cylindrical side wall 114. For cleanliness of operation these are preferably made of stainless steel although other materials may be used. A disc shaped mixing rotor 16, preferably also of stainless steel, is mounted on a rotatable shaft 116 which is supported by bearings 118 and passes in a liquid-tight manner through the bottom wall 112. The top of the shaft and the central area of the rotor are covered by a conical deflector 120.

An inlet 20 for stucco is provided in the top wall 110, preferably in a central or axial position. A further inlet 18 for water is also provided in the top wall, approximately midway between the stucco inlet 20 and the outer periphery of the mixing chamber 12. A first outlet 122 for the slurry formed in the first mixing chamber is provided in the bottom wall 112, preferably in the outermost region thereof, and in the vicinity of the side wall 114. A second outlet 24 is provided diametrically opposite to the first outlet.

Top scrapers 124 are mounted radially on the top of each rotor, being supported at the outer edge of the rotor and extending inwards to the edge of the stucco inlet 20. Bottom scrapers 126 are mounted radially on the under surface of the rotor 16. The scrapers are adjusted to give minimal clearance with the respective walls.

The surface of the rotor can be provided with pegs or teeth, for example around the periphery, but this has not been found necessary in the case of preparing slurries of gypsum plaster.

The apparatus shown in the drawings includes a second mixing chamber 14 which similarly includes top 128 and bottom 130 walls and a cylindrical side wall 132. The top wall 128 may be formed from the same plate as the bottom wall 112 of the first mixing chamber 10.

A second mixing rotor 16' is mounted on a shaft 134 in similar manner to the rotor in the first mixing chamber 12 and may likewise be provided with top and bottom scrapers 136, 138. The top scraper 136 may conveniently extend continuously across the top of the chamber because there is no central inlet for particulate material in the second chamber 14. The rotor has a similar clearance with the side wall 132 and the scrapers similar clearances with the top 128 and bottom 130 wall respectively, as in the first mixing chamber.

The first outlet 122 from the first chamber constitutes the inlet to the second chamber for the unfoamed slurry, and the top wall 128 is also formed with an inlet 22 for previously formed aqueous foam. An outlet 44 for the foamed slurry is provided in the outer region of the bottom wall 130 in close proximity to the side wall 132.

In operation, plaster or stucco is supplied continuously through the inlet 20 and water through the inlet 18. These meet on the upper surface of the rotor element 16, where they are mixed and passed between the rotor and the side wall 114. Some of the resulting slurry passes through the first outlet 122 into the second chamber 14, falling on the upper surface of the rotor 16', where it meets preformed foam entering through the inlet 22. The slurry and the foam are mixed together under lower shear conditions than those prevailing in the first mixing chamber 12, whereby uniform distribution of the incorporated air is achieved with minimal separation of air into significant voids.

The proportion of unfoamed slurry leaving the first mixing chamber 12 by the first outlet 24 to go directly to a slurry application station without foaming will depend upon the relative thickness of the foamed and unfoamed layers in the finished plasterboard and on the degree of foaming to which the foamed slurry is subject. Typically, about 25% by volume of the contents of the first mixing chamber 12 will leave by the first outlet 24 and will not be foamed.

When, as is commonly the case, additives and other ingredients are employed, for example, lightweight aggregate, reinforcing fiber, setting accelerator and starch, these may be added at either stage through specially provided inlets. If an additive is required in both the foamed and the unfoamed slurry, it is preferably added to the first chamber 12. If it is required only in the unfoamed slurry, it can be added to the unfoamed slurry after it has left the first chamber, and if it is required only in the foamed slurry it can be added to the second chamber 14.

Surprisingly, it has been found advantageous to have the second mixing chamber 14 of smaller capacity than the first mixing chamber 12, despite the increased volume (due to the addition of foam) of the contents of the second chamber compared to those of the first chamber. The residence time in the second stage is thus kept very short, so that the total residence time in the complete mixer will be comparable with that in a single stage mixer of the prior art.

The portion of the unfoamed slurry formed in the first chamber 12 which does not pass into the second chamber 14 passes out of the second outlet 24 to the pumps 26, 26' (FIG. 1) and then to the first 28 and third 30 deposition stations. The foamed slurry formed in the second chamber 14 leaves that chamber through the outlet 44 therefrom and passes to the second deposition station 46. As previously described, a first layer 38 of unfoamed slurry is deposited and spread on a first liner paper 32 on the continuous belt 34 at the first station 28, and a second layer of foamed slurry is deposited and spread on the first layer 38 at the second station 46. Unfoamed slurry is also spread at the third station 30 on a second liner paper 36 to form a third layer 40. The second liner paper 36 is then reversed, and the third layer 40 is brought onto the second layer 48 to form the three-layered product shown in FIG. 2.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

We claim:

1. A method for making a multilayer set cementitious product comprising the following steps:
   (a) providing a dual-chambered mixer formed within a single housing, said dual-chambered mixer including a first mixing chamber and a second mixing chamber, said first mixing chamber having a top wall and an opposed bottom wall, said second mixing chamber having a top wall and an opposed bottom wall, a portion of said bottom wall of said first mixing chamber also being a portion of said top wall of said second mixing chamber;
   (b) dispersing particulate cementitious material in a liquid medium under conditions of relatively high shear in said first mixing chamber to form a first slurry;
   (c) blending a first portion of the first slurry with foam under conditions of relatively low shear in said second mixing chamber to form a second, foamed, slurry;
   (d) depositing a first layer of a second portion of the first slurry from the first mixing chamber on a support; and
   (e) depositing a second layer of the second slurry from the second mixing chamber on the surface of the first layer.

2. The method according to claim 1, wherein a third layer of the same slurry as the first layer is deposited on the second layer.

3. The method according to claim 2, wherein the third layer is deposited on a facing sheet, and the coated sheet is applied to the surface of the second layer such that the second and third layers are in contact.

4. The method according to claim 1, wherein the support is a facing sheet.

5. The method according to claim 1, wherein the support is continuously advanced from a first station where the first layer is deposited to a second station where the second layer is deposited.

6. The method according to claim 1, wherein the foam is formed prior to blending with the first portion of the first slurry.

7. The method according to claim 1, wherein at least one additive or other ingredient is added in step (c).

8. The method according to claim 1, wherein the first portion of the first slurry produced by step (b) is directly and continuously transferred from the first mixing chamber to the second mixing chamber.

9. The method according to claim 1, wherein the particulate material is gypsum plaster or stucco and the liquid medium is water.

10. The method according to claim 1, further comprising the steps of:
    providing a first mixing rotor positioned within the first mixing chamber; and
    performing step (b) by rotating the first mixing rotor about a first vertical axis such that the peripheral speed of said first mixing rotor is from 10 to 50 m/s.

11. The method according to claim 10, further comprising the steps of:
    providing a second mixing rotor positioned within the second mixing chamber; and
    performing step (c) by rotating the second mixing rotor about a second vertical axis such that the peripheral speed of said second mixing rotor is from 0.1 to 10 m/s.

12. A method for making a multilayer set cementitious product comprising the following steps:
    (a) providing a dual-chambered mixer formed within a single housing, said dual-chambered mixer including a first mixing chamber and a second mixing chamber, said first mixing chamber having a top wall and an opposed bottom wall, said second mixing chamber having a top wall and an opposed bottom wall, a portion of said bottom wall of said first mixing chamber also being a portion of said top wall of said second mixing chamber;
    (b) dispersing particulate cementitious material in a liquid medium under conditions of relatively high shear in said first mixing chamber to form a first slurry;
    (c) blending a first portion of the first slurry with foam under conditions of relatively low shear in said second mixing chamber to form a second, foamed, slurry;
    (d) depositing a first layer of the second slurry from the second mixing chamber on a support; and
    (e) depositing a second layer of the second portion of the first slurry from the first mixing chamber on the surface of the first layer.

13. The method according to claim 12, wherein a third layer of the same slurry as the first layer is deposited on the second layer.

14. The method according to claim 13, wherein the third layer is deposited on a facing sheet, and the coated sheet is applied to the surface of the second layer such that the second and third layers are in contact.

15. The method according to claim 12, wherein the support is a facing sheet.

16. The method according to claim 12, wherein the support is continuously advanced from a first station where the first layer is deposited to a second station where the second layer is deposited.

17. The method according to claim 12, wherein the foam is formed prior to blending with the first portion of the first slurry.

18. The method according to claim 12, wherein at least one additive or other ingredient is added in step (c).

19. The method according to claim 12, wherein the first portion of the first slurry produced by step (b) is directly and continuously transferred from the first mixing chamber to the second mixing chamber.

20. The method according to claim 12, wherein the particulate material is gypsum plaster or stucco and the liquid medium is water.

21. The method according to claim 12, further comprising the steps of providing a first mixing rotor positioned within the first mixing chamber; and performing step (b) by rotating the first mixing rotor about a first vertical axis such that the peripheral speed of said first mixing rotor is from 10 to 50 m/s.

22. The method according to claim 21, further comprising the steps of:

providing a second mixing rotor positioned within the second mixing chamber; and performing step (c) by rotating the second mixing rotor about a second vertical axis such that the peripheral speed of said second mixing rotor is from 0.1 to 10 m/s.

* * * * *